United States Patent
Tenjimbayashi

(10) Patent No.: US 6,559,955 B2
(45) Date of Patent: May 6, 2003

(54) STRAIGHTNESS MEASURING APPARATUS FOR MOVING STAGE

(75) Inventor: Koji Tenjimbayashi, Ibaraki (JP)

(73) Assignee: Director-General of National Institute of Advanced Industrial Science and Technology, Ministry of Economy, Trade and Industry, Tokyo (JP)

( * ) Notice: Subject to any disclaimer, the term of this patent is extended or adjusted under 35 U.S.C. 154(b) by 0 days.

(21) Appl. No.: 09/817,903

(22) Filed: Mar. 26, 2001

(65) Prior Publication Data

US 2002/0054298 A1 May 9, 2002

(30) Foreign Application Priority Data

Jun. 13, 2000 (JP) .......................... 2000-176973

(51) Int. Cl.$^7$ .............................................. G01B 11/14
(52) U.S. Cl. ..................... 356/614; 356/400; 356/150; 356/153; 356/510; 356/508
(58) Field of Search ................... 356/614, 624, 356/399, 400, 401, 482, 486, 498, 150, 153, 510, 508, 490, 493, 487

(56) References Cited

U.S. PATENT DOCUMENTS

| | | | | |
|---|---|---|---|---|
| 5,029,023 A | * | 7/1991 | Bearden et al. | ........... 356/237.2 |
| 5,276,497 A | * | 1/1994 | Oono | ........................ 356/153 |
| 5,408,318 A | * | 4/1995 | Slater | ........................... 356/487 |
| 5,418,611 A | * | 5/1995 | Huang et al. | ............. 356/141.2 |
| 5,699,158 A | * | 12/1997 | Negishi | ....................... 356/498 |
| 5,987,349 A | * | 11/1999 | Schulz | ....................... 356/141.1 |
| 5,991,040 A | * | 11/1999 | Doemens et al. | ........... 356/614 |
| 6,049,377 A | * | 4/2000 | Lau et al. | ..................... 356/493 |
| 2002/0048027 A1 | * | 4/2002 | Pettersen et al. | ........... 356/614 |

FOREIGN PATENT DOCUMENTS

JP  61235812 A  * 10/1986  ........... G02B/26/10

* cited by examiner

Primary Examiner—Michael G. Lee
Assistant Examiner—Uyen-Chau N. Le
(74) Attorney, Agent, or Firm—Martin A. Farber

(57) ABSTRACT

An apparatus for measuring rectilinear motion and rotation angle errors of a rectilinearly moving body having a horizontal, parallel two-surface mirror positioned in a horizontal plane and including two reflection mirrors whose reflection surfaces face each other and are spaced by a distance ($\sqrt{2}$)d and a vertical, parallel two-surface mirror positioned in a vertical plane and including two reflection mirrors whose reflection surfaces face each other and are spaced by a distance ($\sqrt{2}$)d, and also has a light source for generating a laser beam, semi-transparent mirrors for splitting the laser beam into two laser beams, optical path changing reflection mirrors for changing a direction of each laser beam, and position sensors for detecting positions of the laser beam reflected from the horizontal, parallel two-surface mirror and the vertical, parallel two-surface mirror, respectively fixed to positions outside of the rectilinearly moving body.

2 Claims, 7 Drawing Sheets

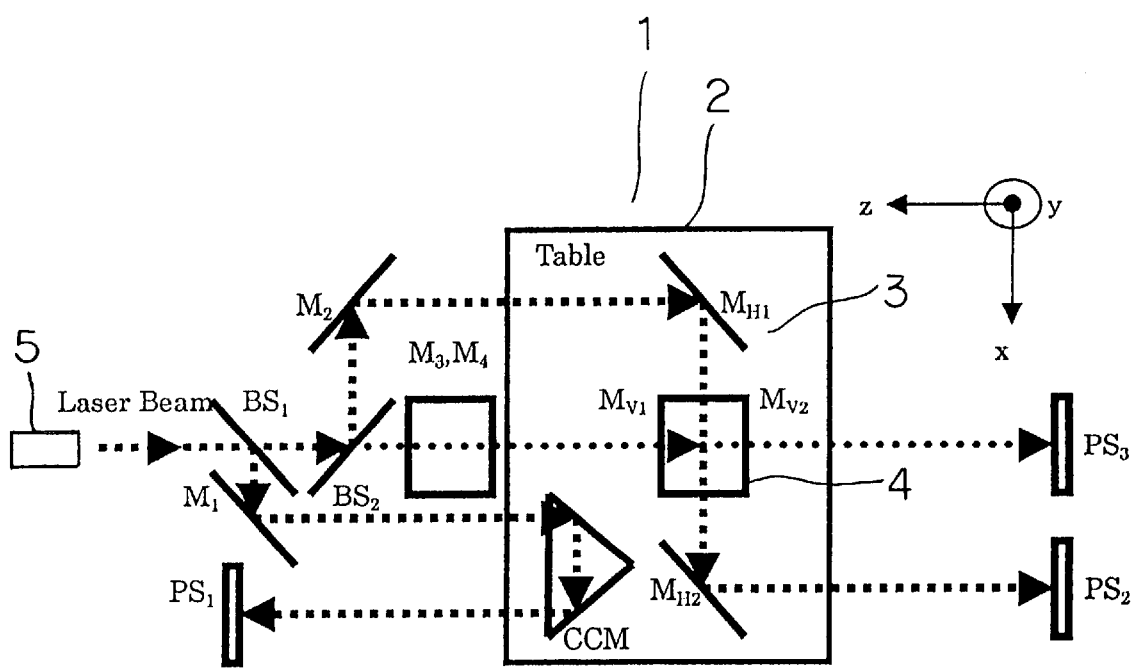
F I G. 1

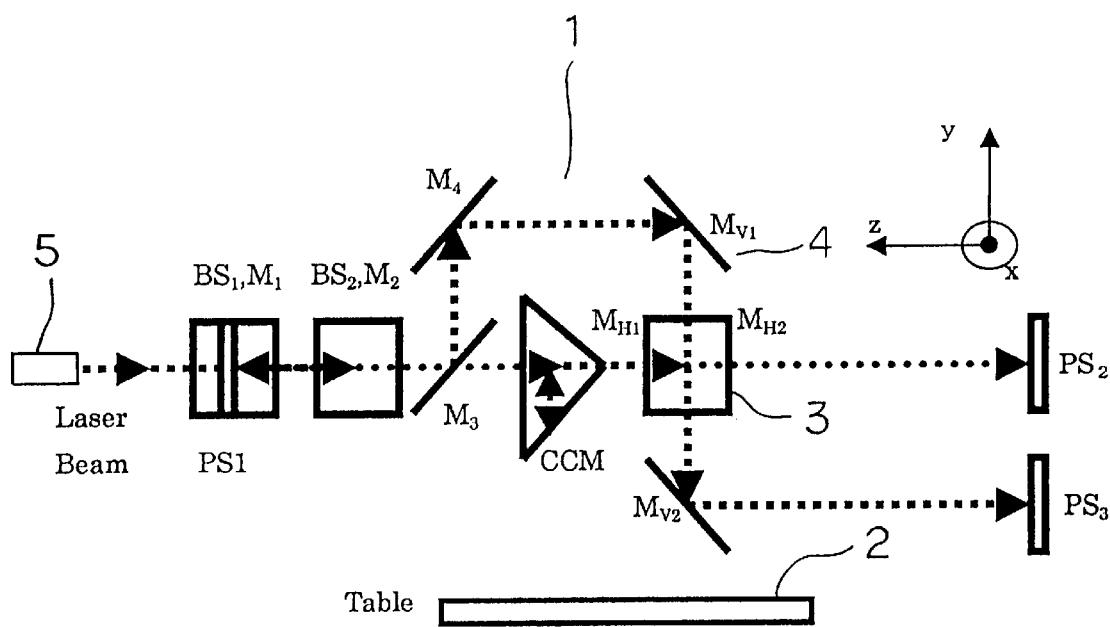
F I G. 2

STRAIGHTNESS MEASURING APPARATUS FOR MOVING STAGE

DETAILED DESCRIPTION OF THE INVENTION

BACKGROUND OF THE INVENTION

1. Field of the Invention

The present invention relates to a straightness measuring apparatus for a rectilinearly moving body. A rectilinearly moving body such as a pulse stage, a rectilinear motion stage and a rectilinear motion stage is used for feeding a machine tool and for various shape measuring apparatus and the like. Precision of works and measurements is largely dependent upon the degree of linearity of the rectilinearly moving body. A method and apparatus for measuring linearity at a high precision is therefore essential for precision inspection and calibration.

2. Description of the Related Art

A rectilinear motion stage is presently used in various fields such as mechanical industries. A measuring apparatus for inspecting or calibrating a rectilinear motion precision at all times is essential. A method of measuring a motion error of a rectilinear stage is already stipulated in JIS, and a measuring apparatus is also already sold. Generally, errors of rectilinear motion and rotation angle are a translation position error and a rotation angle error. The former parallel two-surface mirrors being mounted on the rectilinearly moving body;

- a light source for generating a laser beam;
- semi-transparent mirrors for splitting the laser beam into two laser beams;
- optical path changing reflection mirrors for changing a direction of each laser beam; and
- position sensors for detecting positions of the laser beam reflected from said horizontal, parallel two-surface mirror and said vertical, parallel two-surface mirror,
- wherein a direction of said horizontal, parallel two-surface mirror is set so that directions of each normal to a bottom surface of each reflection surface take respectively:

[Expression 3]

$$m_{H1}=(-1/(\sqrt{2}), 0, 1/(\sqrt{2})), m_{H2}=(1/(\sqrt{2}), 0, 1/(\sqrt{2})) \text{ or}$$

$$m_{H1}=(1/(\sqrt{2}), 0, -1/(\sqrt{2}))\ m'_{H2}(-1/(\sqrt{2}), 0, 1/(\sqrt{2}))$$

a direction of said vertical parallel two-surface mirror is set so that directions of each normal to a bottom surface of each reflection surface take respectively:

[Expression 4]

$$m_{V1}=(0, 1/(\sqrt{2}), -1/(\sqrt{2})), m_{V2}=(0, -1/(\sqrt{2}), 1/(\sqrt{2})) \text{ or}$$

$$m'_{V1}=(0, 1/(\sqrt{2}), 1/(\sqrt{2})), m'_{V2}=(0, -1/(\sqrt{2}), -1/(\sqrt{2}))$$

and said light source, said semi-transparent mirrors, said optical path changing reflection mirrors, said corner cube reflection mirrors and said position sensors has three types of error components, including one type of error components of position determination in a rectilinear direction and two types of error components in the plane vertical to the rectilinear direction (horizontal and vertical directions). The latter has three types of error components including pitching, yawing and rolling.

PROBLEM TO BE SOLVED BY THE INVENTION

With a general method of measuring a rotation angle error of a rectilinear moving body, two error components of pitching and yawing are measured at the same time with an auto-collimator, and rolling is measured with an electronic level. Apparatus using this method is also sold. However, since the principle of an auto-collimator is utilized, although two types of pitching and yawing error components can be measured at the same time, techniques of measuring three types of rotation errors are not still developed.

The present invention proposes a novel method and apparatus for measuring a translation position error of a rectilinear moving body such as a rectilinear table, in addition to rotation angle errors of pitching, yawing and rolling with one method, by utilizing linearity of a laser beam.

The invention has been made in consideration of the above-described circumstances and aims to provide an apparatus for measuring three components of a rotation angle error including pitching, yawing and rolling of a rectilinear moving body such as a rectilinear table in a non-contact manner and at the same time, by utilizing linearity of a laser beam.

BRIEF SUMMARY OF THE INVENTION

In order to achieve the above object, a straightness measuring apparatus for a rectilinearly moving body of this invention comprises: a horizontal, parallel two-surface mirror positioned in a horizontal plane and including two reflection mirrors whose reflection surfaces face each other and are spaced by a distance $(\sqrt{2})d$; a vertical, parallel two-surface mirror positioned in a vertical plane and including two reflection mirrors whose reflection surfaces face each other and are spaced by a distance $(\sqrt{2})d$; a light source for generating a laser beam; semi-transparent mirrors for splitting the laser beam into two laser beams; optical path changing reflection mirrors for changing a direction of each laser beam; and position sensors for detecting positions of the laser beam reflected from the horizontal, parallel two-surface mirror and the vertical, parallel two-surface mirror, wherein a direction of the horizontal, parallel two-surface mirror is set so that directions of each normal to a bottom surface of each reflection surface take respectively:

[Expression 5]

$$m_{H1}=(-1/(\sqrt{2}), 0, 1/(\sqrt{2})), m_{H2}=(1/(\sqrt{2}), 0, 1/(\sqrt{2})) \text{ or}$$

$$m_{H1}(1/(\sqrt{2}), 0, -1/(\sqrt{2})), m'_{H2}=(-1/(\sqrt{2}), 0, 1/(\sqrt{2}))$$

a direction of the vertical parallel two-surface mirror is set so that directions of each normal to a bottom surface of each reflection surface take respectively:

[Expression 6]

$$mm_{V1}=(0, 1/(\sqrt{2}), -1/(\sqrt{2})), m_{V2}=(0, -1/(\sqrt{2}), 1/(\sqrt{2})) \text{ or}$$

$$m'_{V1}(0, -1/(\sqrt{2}), 1/(\sqrt{2})), m'_{V2}(0, -1/(\sqrt{2}), -1/(\sqrt{2}))$$

and the light source, the semi-transparent mirrors, the optical path changing reflection mirrors and the position sensors are fixed to positions outside of the rectilinearly moving body.

DETAILED DESCRIPTION OF THE INVENTION

An embodiment of the invention will be described in detail with reference to the accompanying drawings.

Referring to FIGS. 1 and 2, reference numeral 1 represents a straightness measuring apparatus 1. The straightness measuring apparatus 1 has a rectilinear moving body 2 whose straightness is to be measured according to the invention. The rectilinear moving body 2 is, for example, a pulse stage or a rectilinear motion table.

In a rectangular coordinate system, a propagation direction of the rectilinearly moving body 2 is a z-axis, a horizontal direction is an x-axis and a vertical direction is a y-axis. Two parallel two-surface mirrors each having reflection surfaces facing each other, i.e., a horizontal, parallel two-surface mirror 3 and a vertical, parallel two-surface mirror, are mounted on the rectilinearly moving body 2. The horizontal, parallel two-surface mirror 3 is constituted of two reflection mirrors $M_{H1}$ and $M_{H2}$ whose reflection surfaces are faced each other and spaced by a distance $(\sqrt{2})d$. The vertical, parallel two-surface mirror 4 is constituted of two reflection mirrors $M_{V1}$ and $M_{V2}$ whose reflection surfaces are faced each other and spaced by a distance $(\sqrt{2})d$. Positioned outside of the rectilinearly moving body 2 are: a light source 5 for generating a laser beam; semi-transparent mirrors BS1 and BS2 for splitting a laser beam from the light source 5 into two beams; optical path changing reflection mirrors $M_1$, $M_2$, $M_3$ and $M_4$ for changing the direction of each beam; two pairs of position sensors PS2 and PS3 for detecting horizontal and vertical positions of each beam reflected from the parallel two-surface mirrors 3 and 4; and position sensors PS1 for detecting the position of a reflection beam from corner cube mirrors CCM. A personal computer (not shown) is also installed for controllably driving the rectilinearly moving body 2 and analyzing position sensor outputs.

It is assumed that while the rectilinearly moving body 2 moves straight, rotation errors of a pitching angle $\xi$, yawing angle $\eta$ and a rolling angle $\zeta$ are generated. The rotation errors are obtained from the following expression 7, by representing position errors in the horizontal and vertical directions observed by two position sensors PS2 and PS3 by $x_H$, $y_H$ and $x_V$ and $y_V$:

[Expression 7]

$$\xi = (x_V - y_V - x_H - y_H)/4d \quad (1)$$

$$\eta = (x_V + y_V + x_H - y_H)/4d \quad (2)$$

$$\zeta = (x_V - y_V - x_H + y_H)/4d \quad (3)$$

where it is assumed that the rotation error angles $\xi$, $\eta$ and $\zeta$ are sufficiently small.

Next, specific calculation expressions for obtaining the rotation error angles $\xi$, $\eta$ and $\zeta$ translation error distances $\Delta x$ and $\Delta y$ will be given.

1. Principle

[0] Description of Light Beam on Mirror Surface 1-1 Reflection of Light Beam at Mirror Surface A direction of an incidence light beam is expressed by:
[Expression 8]

$$l_j = \begin{pmatrix} \alpha_j \\ \beta_j \\ \gamma_j \end{pmatrix} \quad (1\text{-}1)$$

and a direction of a reflection light beam is expressed by:
[Expression 9]

$$l_{j+1} = \begin{pmatrix} \alpha_{j+1} \\ \beta_{j+1} \\ \gamma_{j+1} \end{pmatrix} \quad (1\text{-}2)$$

where $\alpha$, $\beta$ and $\gamma$ represent direction cosine, a subscript j represents a reflection order expressed by a natural number, and [ ] represent a matrix or vector.

If an incidence light beam becomes incident upon a point $Q(x_g, y_g, z_g)$ this is expressed by using k as a parameter by:
[Expression 10]

$$L_j: x = \alpha k + x_g,\ y = \beta k + y_g,\ z = \gamma k + z_g \quad (1\text{-}3)$$

By representing a direction of a mirror as:
[Expression 11]

$$m_j = \begin{pmatrix} \lambda_j \\ \mu_j \\ \nu_j \end{pmatrix} \quad (1\text{-}4)$$

and by representing a distance to the mirror surface from an origin by h, an expression of the mirror surface is given by:
[Expression 12]

$$M_j:\ \lambda,\ x + \mu,\ y + \nu,\ z = h \quad (1\text{-}5)$$

where $\lambda$, $\mu$ and $\nu$ represent direction cosine.

Reflection at the mirror is given by a matrix:
[Expression 13]
and a relation between incidence and reflection light beams can be expressed by (refer to FIG. 3):
[Expression 14]

$$l_{j+1} = M_j\ l_j \quad (1\text{-}7)$$

where $M_j$ is herein called a reflection matrix.

1-2 Beam Position by Horizontal, Parallel Two-Surface Mirror before Rotation

The layout of the parallel, two-surface mirror and the like and the coordinate system are set as shown in FIG. 4.

FIG. 4 illustrates reflection of a laser beam at the horizontal, parallel two-surface mirror ($M_{H1,\ 0}$: first reflection mirror surface, $M_{H2,\ 0}$: second reflection mirror surface, $L_{H0}$: incidence light beam, $L_{H1,\ 0}$: reflected light beam by first mirror, $L_{H2,\ 0}$: reflected light beam by second mirror, $Q_{H0}$: incidence point on first mirror surface). A direction of an incidence light beam is:
[Expression 15]

$$l_{H0} = (0,\ 0,\ -1) \quad (2\text{-}1)$$

If the incidence light becomes incident upon a mirror surface point:
[Expression 16]

$$Q_{H0}(-d,\ 0,\ 0) \quad (2\text{-}2)$$

this is expressed by:
[Expression 17]

$$L_{H0}: x=-d,\ y=0,\ z=-k \quad (2\text{-}3)$$

From the expressions (1-1), (1-6) and (1-7), the direction of a light beam reflected by the first mirror is given by:
[Expression 18]

$$l_{H1,0} = \begin{pmatrix} 1 \\ 0 \\ 0 \end{pmatrix} \quad (2\text{-}4)$$

Since the direction of the light beam reflected by the first mirror is $l_{H1,\ 0}$ and passes the point $Q_{H0}$, from the expressions (2-4) and (2-2) the following expressions are obtained:
[Expression 19]

$$L_{H1,\ 0}: x=k,\ y=0,\ z=0 \quad (2\text{-}5)$$

The direction of a light beam reflected by the second mirror is:
[Expression 20]
and the directions of the two-surface mirror before rotation are:
[Expression 21]

$$l_{H2,0} = \begin{pmatrix} 0 \\ 0 \\ -1 \end{pmatrix} \quad (2\text{-}6)$$

Since the two-surface mirror has two mirrors which are parallel and face each other, the expressions (2-7) and (2-8) have inverted signs.

Since the directions of the two-surface mirror are given by the expressions (2-7) and (2-8) and the distance from the origin to the mirror surface is both $(\sqrt{2})d$, it stands therefore from the expression (1-5):
[Expression 22]

$$M_{H1,\ 0}: -x-z=d \quad (2\text{-}9)$$

$$M_{H2,\ 0}: x+z=d \quad (2\text{-}10)$$

The reflection point $R_{H2,\ 0}$ on the second mirror surface is given from the expressions (2-5) and (2-10) by:
[Expression 23]

$$R_{H2,\ 0}(d,\ 0,\ 0) \quad (2\text{-}11)$$

Therefore, the light beam reflected by the second mirror is:
[Expression 24]

$$L_{H2,\ 0}: x=d,\ y=0,\ z=-k \quad (2\text{-}12)$$

It is assumed that the position of a position sensor is:
[Expression 25]

$$P_{S\ H}(d,\ 0,\ -z_n) \quad (2\text{-}13)$$

and that $Z_H$ is sufficiently larger than the stroke of the table.

2-3 Beam Position by Pitching of Horizontal, Parallel Two-Surface Mirror

A rotation matrix rotating right about the x-axis by $\xi$ is given by:
[Expression 26]

$$R_\xi = \begin{pmatrix} 1 & 0 & 0 \\ 0 & \cos\xi & -\sin\xi \\ 0 & \sin\xi & \cos\xi \end{pmatrix} \quad (3\text{-}1)$$

By substituting the expressions (6-7) and (6-8) into the expression (3-1), the direction of the rotated mirror is given by:
[Expression 27]

$$m_{H1,\xi} = R_\xi m_{H1,0} = \begin{pmatrix} -1/(\sqrt{2}) \\ \sin\xi/(\sqrt{2}) \\ -\cos\xi/(\sqrt{2}) \end{pmatrix} \quad (3\text{-}2)$$

$$m_{H2,\xi} = R_\xi m_{H2,0} = \begin{pmatrix} 1-/(\sqrt{2}) \\ -\sin\xi/(\sqrt{2}) \\ \cos\xi/(\sqrt{2}) \end{pmatrix} \quad (3\text{-}3)$$

Therefore, by substituting the expressions (3-2) and (3-3) into the expression (1-5), the surfaces of the two-surface mirror are given by:
[Expression 28]

$$M_{H1,\ \xi}: -x+\sin\xi\ y-\cos\xi\ z=d \quad (3\text{-}4)$$

$$M_{H2,\ \xi}: x-\sin\xi\ y+\cos\xi\ z=d \quad (3\text{-}5)$$

From the expressions (6-3) and (3-4), the reflection point by the first mirror is given by:
[Expression 29]

$$R_{H1,\ \xi}(-d,\ 0,\ 0) \quad (3\text{-}6)$$

By substituting the expressions (3-2) and (3-3) into the expression (1-6), the reflection matrixes of the rotated two-surface mirror are:
[Expression 30]

$$M_{1,\xi} = \begin{pmatrix} 0 & \sin\xi & -\cos\xi \\ \sin\xi & \cos^2\xi & \sin\xi\cos\xi \\ -\cos\xi & \sin\xi\cos\xi & \sin^2\xi \end{pmatrix} \quad (3\text{-}7)$$

$$M_{2,\xi} = \begin{pmatrix} 0 & \sin\xi & -\cos\xi \\ \sin\xi & \cos^2\xi & \sin\xi\cos\xi \\ -\cos\xi & \sin\xi\cos\xi & \sin^2\xi \end{pmatrix} \quad (3\text{-}8)$$

Therefore, from the expressions (3-7) and (6-1), the direction of the light beam reflected by the first mirror is:
[Expression 31]

$$l_{H1,\xi} = M_{1,\xi} l_{H0} = \begin{pmatrix} \cos\xi \\ -\sin\xi\cos\xi \\ -\sin^2\xi \end{pmatrix} \quad (3\text{-}9)$$

From the expressions (3-8) and (3-9), the direction of the light beam reflected by the second mirror is:

[Expression 32]

$$l_{H2,\xi} = M_{2,\xi} l_{H1,\xi} = \begin{pmatrix} 0 \\ 0 \\ -1 \end{pmatrix} \quad (3\text{-}10)$$

Since the direction of the light beam reflected by the first mirror is $l_{H1,\xi}$ and passes the reflection point $R_{H1,\xi}$, from the expressions (3-9) and (3-6) the following expressions are obtained:
[Expression 33]

$$L_{H1,\xi}: x=\cos\xi\,k-d,\ y=-\sin\xi\cos\xi\,k,\ z=-\sin^2\xi\,k \quad (3\text{-}11)$$

Since the reflection point on the second mirror is a cross point between $M_{H2,\xi}$ and $L_{H1,\xi}$, from the expressions (3-5) and (3-11), it stands:
[Expression 34]

$$R_{H2,\xi}\ (d,\ -2\sin\xi\,d,\ -2\sin^2\xi\,d/\cos\xi) \quad (3\text{-}12)$$

2-4 Beam Position by Yawing of Horizontal, Parallel Two-Surface Mirror

A rotation matrix rotating right about the y-axis by $\eta$ is given by:
[Expression 35]

$$R_\eta = \begin{pmatrix} \cos\eta & 0 & \sin\eta \\ 0 & 1 & 0 \\ -\sin\eta & 0 & \cos\eta \end{pmatrix} \quad (4\text{-}1)$$

By substituting the expressions (6-7) and (6-8) into the expression (7-1), the direction of the rotated mirror is given by:
[Expression 36]
Therefore, by substituting the expressions (4-2) and (4-3) into the expression (1-5), the two-surface mirror is given by:
[Expression 37]

$$M_{H1,\eta}: -(\cos\eta+\sin\eta)\,x+(\sin\eta-\cos\eta)\,z=d \quad (4\text{-}4)$$

$$M_{H2,\eta}: (\cos\eta+\sin\eta)\,x+(\cos\eta-\sin\eta)\,z=d \quad (4\text{-}5)$$

Since the reflection point by the first mirror is a cross point between $M_{H1,0}$ and $l_{H1,0}$, from the expressions (6-5) and (4-4), it stands:
[Expression 38]

$$R_{H1,\eta}=(-d,\ 0,\ (\cos\eta+\sin\eta-1)/(\cos\eta-\sin\eta)d) \quad (4\text{-}6)$$

By substituting the expressions (4-2) and (4-3) into the expression (1-6), the reflection matrixes of the rotated two-surface mirror are:
[Expression 39]

$$M_{1,\eta} = \begin{pmatrix} -\sin 2\eta & 0 & -\cos 2\eta \\ 0 & 1 & 0 \\ -\cos 2\eta & 0 & \sin 2\eta \end{pmatrix} \quad (4\text{-}7)$$

$$M_{2,\eta} = \begin{pmatrix} -\sin 2\eta & 0 & -\cos 2\eta \\ 0 & 1 & 0 \\ -\cos 2\eta & 0 & \sin 2\eta \end{pmatrix} \quad (4\text{-}8)$$

Therefore, from the expressions (7-7) and (6-4), the direction of the light beam reflected by the first mirror is:
[Expression 40]

$$l_{H1,\eta} = M_{H1,\eta} l_0 = \begin{pmatrix} \cos 2\eta \\ 0 \\ -\sin 2\eta \end{pmatrix} \quad (4\text{-}9)$$

From the expressions (3-8) and (3-9), the direction of the light beam reflected by the second mirror is:
[Expression 41]

$$l_{H2,\eta} = M_{H2,\eta} l_{H1,\eta} = \begin{pmatrix} 0 \\ 0 \\ -1 \end{pmatrix} \quad (4\text{-}10)$$

Since the direction of the light beam reflected by the first mirror is $l_{H1}$ and passes the reflection point $R_{H1,\eta}$, from the expressions (4-9) and (4-6) the following expressions are obtained:
[Expression 42]

$$L_{H1,\eta}: x=\cos 2\eta\,k-d,\ y=0,\ z=-\sin 2\eta\,k+(\cos\eta+\sin\eta-1)/(\cos\eta-\sin\eta)d \quad (4\text{-}11)$$

Since the reflection point on the second mirror is a cross point between $M_{H2\eta}$ and $L_{H1,\eta}$, from the expressions (4-5) and (4-11), it stands:
[Expression 43]

$$R_{H2,\eta}\ (\{2(\cos\eta+\sin\eta)-1\}d,\ 0,\ (-2\sin 2\eta+\cos\eta+\sin\eta-1)\,d/(\cos\eta-\sin\eta)) \quad (4\text{-}12)$$

2-5 Beam Position by Rolling of Horizontal, Parallel Two-Surface Mirror

A rotation matrix rotating right about the z-axis by $\zeta$ is given by:
[Expression 44]

$$R_\zeta = \begin{pmatrix} \cos\zeta & -\sin\zeta & 0 \\ \sin\zeta & \cos\zeta & 0 \\ 0 & 0 & 1 \end{pmatrix} \quad (5\text{-}1)$$

By substituting the expressions (6-7) and (6-8) into the expression (5-1), the direction of the rotated mirror is given by:
[Expression 45]

$$m_{H1,\zeta}=R_\zeta m_{H1,0}=[-\cos\zeta/(\sqrt 2),\ -\sin\zeta/(\sqrt 2),\ -1/(\sqrt 2)] \quad (5\text{-}2)$$

$$m_{H2,\zeta}=R_\zeta m_{H2,0}=[\cos\zeta/(\sqrt 2),\ \sin s\,\zeta/(\sqrt 2),\ 1/(\sqrt 2)] \quad (5\text{-}3)$$

Therefore, by substituting the expressions (5-2) and (5-3) into the expression (1-5), the surfaces of the two-surface mirror are given by:
[Expression 46]

$$M_{H1,\zeta}: -\cos\zeta\,x-\sin\zeta\,y-z=d \quad (5\text{-}4)$$

$$M_{H2,\zeta}: \cos\zeta\,x+\sin\zeta\,y+z=d \quad (5\text{-}5)$$

Since the reflection point by the first mirror is a cross point between $M_{H1,\zeta}$ and $L_{H1,0}$, from the expressions (6-5) and (5-4), it stands:
[Expression 47]

$$R_{H1,\zeta} (-d, 0, (\cos\zeta-1)d) \qquad (5-6)$$

By substituting the expressions (5-2) and (5-3) into the expression (1-6), the reflection matrixes of the rotated two-surface mirror are:
[Expression 48]

$$M_{H1,\zeta} = \begin{pmatrix} \sin^2\zeta & -\sin\zeta\cos\zeta & -\cos\zeta \\ -\sin\zeta\cos\zeta & \cos^2\zeta & -\sin\zeta \\ -\cos\zeta & -\sin\zeta & 0 \end{pmatrix} \qquad (5-7)$$

$$M_{H2,\zeta} = \begin{pmatrix} \sin^2\zeta & -\sin\zeta\cos\zeta & -\cos\zeta \\ -\sin\zeta\cos\zeta & \cos^2\zeta & -\sin\zeta \\ -\cos\zeta & -\sin\zeta & 0 \end{pmatrix} \qquad (5-8)$$

Therefore, from the expressions (5-7) and (6-4), the direction of the light beam reflected by the first mirror is:
[Expression 49]

$$l_{H1,\zeta} = M_{H1,\zeta} l_0 = \begin{pmatrix} \cos\zeta \\ \sin\zeta \\ 0 \end{pmatrix} \qquad (5-9)$$

From the expressions (5-8) and (5-9), the direction of the light beam reflected by the second mirror is:
[Expression 50]

$$l_{H2,\zeta} = M_{H2,\zeta} l_{H1,\zeta} = \begin{pmatrix} 0 \\ 0 \\ -1 \end{pmatrix} \qquad (5-10)$$

Since the direction of the light beam reflected by the first mirror is $l_{H1,\zeta}$ and passes the reflection point $R_{H1,\zeta}$, from the expressions (5-9) and (5-6) the following expressions are obtained:
[Expression 51]

$$L_{H1,\zeta}: x=\cos\zeta\, k-d,\ y=-\sin\zeta\, k,\ z=(\cos\zeta-1)d \qquad (5-11)$$

Since the reflection point on the second mirror is a cross point between $M_{H2,\zeta}$ and $L_{H1,\zeta}$, from the expressions (5-5) and (5-11), it stands:
[Expression 52]

$$R_{H2,\zeta} ((2\cos\zeta-1)d,\ 2\sin\zeta\, d,\ (\cos\zeta-1)d) \qquad (5-12)$$

2-6 Beam Position by Vertical, Parallel Two-Surface Mirror before Rotation

The layout of the parallel, two-surface mirror and the coordinate system are set as shown in FIG. 5.

FIG. 5 illustrates reflection of a laser beam at the vertical, parallel two-surface mirror ($M_{V1,0}$: first reflection mirror surface, $M_{V2,0}$: second reflection mirror surface, $L_0$: incidence light beam, $L_{V1,0}$: reflected light beam by first mirror, $L_{V2,0}$ reflected light beam by second mirror, $Q_{V0}$: incidence point on first mirror surface, $PS_V$: position sensor). A direction of an incidence light beam is:

[Expression 53]

$$l_{V0} = \begin{pmatrix} 0 \\ 0 \\ -1 \end{pmatrix} \qquad (6-1)$$

If the incidence light becomes incident upon a mirror surface point:
[Expression 54]

$$Q_{V0} (0, d, 0) \qquad (6-2)$$

this is expressed by:
[Expression 55]

$$L_{V0}: x=0,\ y=d,\ z=-k \qquad (6-3)$$

From the expressions (6-1), (1-6) and (1-7), the direction of a light beam reflected by the first mirror is given by:
[Expression 56]

$$l_{V1,0} = \begin{pmatrix} 0 \\ -1 \\ 0 \end{pmatrix} \qquad (6-4)$$

Since the direction of the light beam reflected by the first mirror is $l_{V0}$ and passes the point $Q_{V0}$ from the expressions (6-4) and (6-2) the following expressions are obtained:
[Expression 57]

$$L_{V1,0}: x=0,\ y=-k,\ z=0 \qquad (6-5)$$

From the expressions (6-4), (1-6) and (1-7), the direction of a light beam reflected by the second mirror is:
[Expression 58]

$$l_{V2,0} = \begin{pmatrix} 0 \\ 0 \\ -1 \end{pmatrix} \qquad (6-6)$$

The directions of the two-surface mirror before rotation are:
[Expression 59]

$$m_{V1,0} = \begin{pmatrix} 0 \\ 1/(\sqrt{2}) \\ -1/(\sqrt{2}) \end{pmatrix} \qquad (6-7)$$

$$m_{V2,0} = \begin{pmatrix} 0 \\ -1/(\sqrt{2}) \\ 1/(\sqrt{2}) \end{pmatrix} \qquad (6-8)$$

Since the two-surface mirror has two mirrors which are parallel and face each other, the expressions (6-7) and (6-8) have inverted signs.

Since the directions of the two-surface mirror are given by the expressions (6-7) and (6-8) and the distance from the origin to the mirror surface is both ($\sqrt{2}$)d, it stands therefore from the expression (1-5):

[Expression 60]

$$M_{V1,0}: y-z=d \quad (6-9)$$

$$M_{V2,0}: -y+z=d \quad (6-10)$$

The reflection point on the second mirror surface is given from the expressions (6-5) and (6-10) by:
[Expression 61]

$$R_{V2,0} (0, -d, 0) \quad (6-11)$$

Therefore, the light beam reflected by the second mirror is:
[Expression 62]

$$L_{V2,0}: x=0, y=-d, z=-k \quad (6-12)$$

It is assumed that the position of a position sensor is:
[Expression 63]

$$P S_V=(0, -d, -z_V) \quad (6-13)$$

and that $Z_V$ is sufficiently larger than the stroke of the table.

2-7 Beam Position by Pitching of Vertical, Parallel Two-Surface Mirror

A rotation matrix rotating right about the x-axis by $\xi$ is given by:
[Expression 64]

$$R_\xi = \begin{pmatrix} 1 & 0 & 0 \\ 0 & \cos\xi & -\sin\xi \\ 0 & \sin\xi & \cos\xi \end{pmatrix} \quad (7-1)$$

By substituting the expressions (1-7) and (1-8) into the expression (8-1), the direction of the rotated mirror is given by:
[Expression 65]

$$m_{V1,\xi} = R_\xi m_{V1,0} = \begin{pmatrix} 0 \\ (\cos\xi + \sin\xi)/(\sqrt{2}) \\ (-\cos\xi + \sin\xi)/(\sqrt{2}) \end{pmatrix} \quad (7-2)$$

$$m_{V2,\xi} = R_\xi m_{V2,0} = \begin{pmatrix} 0 \\ (-\cos\xi - \sin\xi)/(\sqrt{2}) \\ (\cos\xi - \sin\xi)/(\sqrt{2}) \end{pmatrix} \quad (7-3)$$

Therefore, by substituting the expressions (7-2) and (7-3) into the expression (1-5), the surfaces of the two-surface mirror are given by:
[Expression 66]

$$M_{v1,\xi}: (\cos\xi + \sin\xi) y + (\sin\xi - \cos\xi) z = d \quad (7-4)$$

$$M_{v2,\xi}: -(\cos\xi + \sin\xi) y - (\sin\xi - \cos\xi) z = d \quad (7-5)$$

From the expressions (1-3) and (7-4) the reflection point by the first mirror is given by:
[Expression 67]

$$R_{V1,\xi} (0, d, (1-\cos\xi-\sin\xi) d/(\sin\xi-\cos\xi)) \quad (7-6)$$

By substituting the expressions (7-2) and (7-3) into the expression (1-6), the reflection matrixes of the rotated two-surface mirror are:

[Expression 68]

$$M_{V1,\xi} = \begin{pmatrix} 1 & 0 & 0 \\ 0 & -\sin 2\xi & \cos 2\xi \\ 0 & \cos 2\xi & \sin 2\xi \end{pmatrix} \quad (7-7)$$

$$M_{V2,\xi} = \begin{pmatrix} 1 & 0 & 0 \\ 0 & -\sin 2\xi & \cos 2\xi \\ 0 & \cos 2\xi & \sin 2\xi \end{pmatrix} \quad (7-8)$$

Therefore, from the expressions (7-7) and (1-1), the direction of the light beam reflected by the first mirror is:
[Expression 69]

$$l_{V1,\xi} = M_{V1,\xi} l_{V0} = \begin{pmatrix} 0 \\ -\cos 2\xi \\ -\sin 2\xi \end{pmatrix} \quad (7-9)$$

From the expressions (7-8) and (7-9), the direction of the light beam reflected by the second mirror is:
[Expression 70]

$$l_{V2,\xi} = M_{V2,\xi} l_{V1,\xi} = \begin{pmatrix} 0 \\ 0 \\ -1 \end{pmatrix} \quad (7-10)$$

Since the direction of the light beam reflected by the first mirror is $l_{V1,\xi}$ and passes the reflection point $R_{V1,\xi}$, from the expressions (7-9) and (7-6) the following expressions are obtained:
[Expression 71]

$$L_{v1,\xi}: x=0, y=-\cos 2\xi\, k+d, z=-\sin 2\xi\, k+(1-\cos\xi-\sin\xi)d/(\sin\xi-\cos\xi)$$

Since the reflection point on the second mirror is a cross point between $M_{V2,\xi}$ and $L_{V1,\xi}$, from the expressions (7-5) and (7-11), it stands:
[Expression 72]

$$R_{V2,\xi} (0, \{-2(\cos\xi+\sin\xi)+1\}d, (2\sin 2\xi - \cos\xi - \sin\xi+1)d/(\sin\xi-\cos\xi)) \quad (7-12)$$

2-8 Beam Position by Yawing of Vertical, Parallel Two-surface Mirror

A rotation matrix rotating right about the y-axis by $\eta$ is given by:
[Expression 73]

$$R_\eta = \begin{pmatrix} \cos\eta & 0 & \sin\eta \\ 0 & 1 & 0 \\ -\sin\eta & 0 & \cos\eta \end{pmatrix} \quad (8-1)$$

By substituting the expressions (1-7) and (1-8) into the expression (8-1), the direction of the rotated mirror is given by:

[Expression 74]

$$m_{VI,\eta} = R_\eta m_{VI,0} = \begin{pmatrix} -\sin\eta/(\sqrt{2}) \\ -1/(\sqrt{2}) \\ -\cos\eta/(\sqrt{2}) \end{pmatrix} \quad (8\text{-}2)$$

$$m_{V2,\eta} = R_\eta m_{V2,0} = \begin{pmatrix} \sin\eta/(\sqrt{2}) \\ -1/(\sqrt{2}) \\ \cos\eta/(\sqrt{2}) \end{pmatrix} \quad (8\text{-}3)$$

Therefore, by substituting the expressions (8-2) and (8-3) into the expression (1-5) the two-surface mirror is given by:

[Expression 75]

$$M_{V1\,\eta}: -\sin\eta\, x + y - \cos\eta\, z = d \quad (8\text{-}4)$$

$$M_{M2\,\eta}: \sin\eta\, x - y + \cos\eta\, z = d \quad (8\text{-}5)$$

Since the reflection point by the first mirror is a cross point between $M_{V1,\,\eta}$ and $L_{V1,\,0}$, from the expressions (1-3) and (8-4), it stands:

[Expression 76]

$$R_{V1,\,\eta}\,(0,\,d,\,0) \quad (8\text{-}6)$$

By substituting the expressions (8-2) and (8-3) into the expression (1-6), the reflection matrixes of the rotated two-surface mirror are:

[Expression 77]

$$M_{1,\eta} = \begin{pmatrix} \cos^2\eta & \sin\eta & -\sin\eta\cos\eta \\ \sin\eta & 0 & \cos\eta \\ -\sin\eta\cos\eta & \cos\eta & \sin^2\eta \end{pmatrix} \quad (8\text{-}7)$$

$$M_{2,\eta} = \begin{pmatrix} \cos^2\eta & \sin\eta & -\sin\eta\cos\eta \\ \sin\eta & 0 & \cos\eta \\ -\sin\eta\cos\eta & \cos\eta & \sin^2\eta \end{pmatrix} \quad (8\text{-}8)$$

Therefore, from the expressions (8-7) and (1-1), the direction of the light beam reflected by the first mirror is:

[Expression 78]

$$l_{V1,\eta} = M_{V1,\eta}l_{V0} = \begin{pmatrix} \sin\eta\cos\eta \\ -\cos\eta \\ -\sin^2\eta \end{pmatrix} \quad (8\text{-}9)$$

From the expressions (8-8) and (8-9), the direction of the light beam reflected by the second mirror is:

[Expression 79]

$$l_{V2,\eta} = M_{V2,\eta}l_{V1,\eta} = \begin{pmatrix} 0 \\ 0 \\ -1 \end{pmatrix} \quad (8\text{-}10)$$

Since the direction of the light beam reflected by the first mirror is $l_{V1\,\eta}$, and passes the reflection point $R_{V1,\,\eta}$, from the expressions (8-9) and (8-6) the following expressions are obtained:

[Expression 80]

$$L_{V1\,\eta}: x = \sin\eta\cos\eta\,k,\ y = -\cos\eta\,k + d,\ z = -\sin\eta\,k \quad (8\text{-}11)$$

Since the reflection point on the second mirror is a cross point between $M_{V2,\,\eta}$ and $L_{V2,\,\eta}$, from the expressions (8-5) and (8-11), it stands:

[Expression 81]

$$R_{V2,\,\eta}\,(2\sin\eta\,d,\,-d,\,-2\sin^2\eta\,d/\cos\eta) \quad (8\text{-}12)$$

2-9 Beam Position by Rolling of Vertical, Parallel Two-Surface Mirror

A rotation matrix rotating right about the z-axis by $\zeta$ is given by:

[Expression 82]

$$R_\zeta = \begin{pmatrix} \cos\zeta & -\sin\zeta & 0 \\ \sin\zeta & \cos\zeta & 0 \\ 0 & 0 & 1 \end{pmatrix} \quad (9\text{-}1)$$

By substituting the expressions (1-7) and (1-8) into the expression (9-1), the direction of the rotated mirror is given by:

[Expression 83]

$$m_{VI,\zeta} = R_\zeta m_{VI,0} = \begin{pmatrix} -\sin\zeta/(\sqrt{2}) \\ \cos\zeta/(\sqrt{2}) \\ -1/(\sqrt{2}) \end{pmatrix} \quad (9\text{-}2)$$

$$m_{V2,\zeta} = R_\zeta m_{V2,0} = \begin{pmatrix} \sin\zeta/(\sqrt{2}) \\ \cos\zeta/(\sqrt{2}) \\ 1/(\sqrt{2}) \end{pmatrix} \quad (9\text{-}3)$$

Therefore, by substituting the expressions (9-2) and (9-3) into the expression (1-5), the surfaces of the two-surface mirror are given by:

[Expression 84]

$$M_{V1,\,\zeta}: -\sin\zeta\, x + \cos\zeta\, y - z = d \quad (9\text{-}4)$$

$$M_{V2,\,\zeta}: \sin\zeta\, x - \cos\zeta\, y + z = d \quad (9\text{-}5)$$

Since the reflection point by the first mirror is a cross point between $M_{V1,\,\zeta}$ and $L_{V1,\,0}$, from the expressions (1-5) and (9-4), it stands:

[Expression 85]

$$R_{V1\,\zeta}\,(0,\,d,\,(\cos\zeta - 1)d) \quad (9\text{-}6)$$

By substituting the expressions (9-2) and (9-3) into the expression (1-6), the reflection matrixes of the rotated two-surface mirror are:

[Expression 86]

$$M_{VI,\zeta} = \begin{pmatrix} \cos^2\zeta & \sin\zeta\cos\zeta & -\sin\zeta \\ \sin\zeta\cos\zeta & \sin^2\zeta & \cos\zeta \\ -\sin\zeta & \cos\zeta & 0 \end{pmatrix} \quad (9\text{-}7)$$

$$M_{V2,\zeta} = \begin{pmatrix} \cos^2\zeta & \sin\zeta\cos\zeta & -\sin\zeta \\ \sin\zeta\cos\zeta & \sin^2\zeta & \cos\zeta \\ -\sin\zeta & \cos\zeta & 0 \end{pmatrix} \quad (9\text{-}8)$$

Therefore, from the expressions (9-7) and (1-1), the direction of the light beam reflected by the first mirror is:

[Expression 87]

$$l_{V1,\zeta} = M_{v1,\zeta}l_0 = \begin{pmatrix} \sin\zeta \\ -\cos\zeta \\ 0 \end{pmatrix} \quad (9\text{-}9)$$

From the expressions (9-8) and (9-9), the direction of the light beam reflected by the second mirror is:
[Expression 88]

$$l_{V2,\zeta} = M_{V2,\zeta}l_{V1,\zeta} = \begin{pmatrix} 0 \\ 0 \\ -1 \end{pmatrix} \quad (9\text{-}10)$$

Since the direction of the light beam reflected by the first mirror is $l_{V1,\zeta}$ and passes the reflection point $R_{V1,\zeta}$, from the expressions (9-9) and (9-6) the following expressions are obtained:
[Expression 89]

$$L_{V1,\zeta}: x=\sin\zeta\, k,\ y=-\cos\zeta\, k+d,\ z=(\cos\zeta-1)d \quad (9\text{-}11)$$

Since the reflection point on the second mirror is a cross point between $M_{V2,\zeta}$ and $L_{V1,\zeta}$, from the expressions (9-5) and (9-11), it stands:
[Expression 90]

$$R_{V2,\zeta}\ (2\sin\zeta d,\ (1-2\cos\zeta)d,\ (\cos\zeta-1)d) \quad (9\text{-}12)$$

2-10 Calculation of Rotation Angle Error from Beam Position Detection Amount

The beam positions reflected by the horizontal, parallel two-surface mirror and detected with the position sensor $PS_H$ are represented by $X_H$ and $Y_H$, and the beam positions reflected by the vertical, parallel two-surface mirror and detected with the position sensor $PS_V$ are represented by $X_V$ and $Y_V$.

First, the beam position detection amount by the position sensor is calculated assuming that there is a single rotation error of the parallel two-surface mirror.

When the horizontal, parallel two-surface mirror has a pitch angle of $\xi$, the detection amount of the reflected beam position is given from the expressions (2-13) and (3-12) by:
[Expression 91]

$$X_{H\,\xi}=0 \quad (10\text{-}1\,a)$$

$$Y_{H\,\xi}=-2\sin\xi d \quad (10\text{-}1\,b)$$

When the horizontal, parallel two-surface mirror has a yaw angle $\eta$, the detection amount of the reflected beam position is given from the expressions (2-13) and (4-12) by:
[Expression 92]

$$X_{H\,\eta}=2\,(\cos\eta+\sin\eta-1)d \quad (10\text{-}2\,a)$$

$$Y_{H\,\eta}=0 \quad (10\text{-}2\,b)$$

When the horizontal, parallel two-surface mirror has a roll angle $\zeta$, the detection amount of the reflected beam position is given from the expressions (2-13) and (5-12) by:
[Expression 93]

$$X_{H\,\zeta}=2\,(\cos\zeta-1)d \quad (10\text{-}3\,a)$$

$$Y_{H\,\zeta}=2\sin\zeta d \quad (10\text{-}3\,b)$$

When the vertical, parallel two-surface mirror has a pitch angle of $\xi$, the detection amount of the reflected beam position is given from the expressions (6-13) and (7-12) by:
[Expression 94]

$$X_{V\,\xi}=0 \quad (10\text{-}4\,a)$$

$$Y_{V\,\xi}=-2(\cos\xi+\text{son}\,\xi-1)d \quad (10\text{-}4\,b)$$

When the vertical, parallel two-surface mirror has a yaw angle $\eta$, the detection amount of the reflected beam position is given from the expressions (6-13) and (8-12) by:
[Expression 95]

$$X_{V\,\eta}=2\sin\eta d \quad (10\text{-}5\,a)$$

$$Y_{V\,\eta}=0 \quad (1\,0\text{-}5\,b)$$

When the horizontal, parallel two-surface mirror has a roll angle $\zeta$, the detection amount of the reflected beam position is given from the expressions (6-13) and (9-12) by:
[Expression 96]

$$X_{V\,\zeta}=2\sin\zeta d \quad (10\text{-}6\,a)$$

$$Y_{V\,\zeta}=-2(\cos\zeta-1)d \quad (10\text{-}6\,b)$$

Next, the beam position detection amount by the position sensor is calculated assuming that there is a composite rotation error of the parallel two-surface mirror.

If there are the rotation angle errors of all the pitch angle $\xi$, yaw angle $\eta$ and roll angle $\zeta$ at the same time, the X coordinate value of the beam position reflected by the horizontal, parallel two-surface mirror is obtained through addition of the expressions (10-1a), (10-2a) and (10-3a) by:
[Expression 97]

$$X_{H\,T}=2(\cos\eta+\sin\eta+\cos\zeta-2)d \quad (10\text{-}7)$$

and similarly the Y coordinated value is obtained through addition of the expressions (10-1b), (10-2b) and (10-3b) by:
[Expression 98]

$$Y_{H\,T}=2(-\sin\xi+\sin\zeta)d \quad (10\text{-}8)$$

If there are the rotation angle errors of all the pitch angle $\xi$, yaw angle $\eta$ and roll angle $\zeta$ at the same time, the X coordinate value of the beam position reflected by the vertical, parallel two-surface mirror is obtained through addition of the expressions (10-4a), (10-5a) and (10-6a) by:
[Expression 99]

$$X_{V\,T}=2(\sin\eta+\sin\zeta)d \quad (10\text{-}9)$$

and similarly the Y coordinated value is obtained through addition of the expressions (10-4b), (10-5b) and (10-6b) by:
[Expression 100]

$$Y_{V\,T}=-2(\cos\xi+\sin\xi+\cos\zeta-2)d \quad (10\text{-}10)$$

The expressions (10-7) to (10-9) are rewritten as:
[Expression 101]

$$\cos\eta + \sin\eta + \cos\zeta = X_{H\,T}/(2\,d) + 2 \quad (10\text{-}11)$$

$$-\sin\xi + \sin\zeta = Y_{H\,T}/(2\,d) \quad (10\text{-}12)$$

$$\sin\eta + \sin\zeta = X_{V\,T}/(2\,d) \quad (10\text{-}13)$$

$$\cos\xi + \sin\xi + \cos\zeta = -Y_{V\,T}/(2\,d) + 2 \quad (10\text{-}14)$$

As $\cos\zeta$ is eliminated through substraction between the expressions (10-13) and (10-14), it becomes:
[Expression 102]

$$-(\sin\xi + \cos\xi) + (\sin\eta + \cos\eta) = (X_{H\,T} + Y_{V\,T})/(2\,d) \quad (10\text{-}15)$$

As $\sin\zeta$ is eliminated through substraction of (10-13)-(10-12), it becomes:
[Expression 103]

$$\sin\xi + \sin\eta = (X_{V\,T} - Y_{H\,T})/(2\,d) \quad (10\text{-}16)$$

Since the rotation angle error is generally sufficiently small, approximate expressions of $\sin\theta \approx \theta$ and $\cos\theta \approx 1$ for small $\theta$ are incorporated. The expressions (10-12) and (10-13) and the expressions (10-15) and (10-16) are therefore expressed as:
[Expression 104]

$$-\xi + \zeta = Y_{H\,T}/(2\,d) \quad (10\text{-}17)$$

$$\eta + \zeta = X_{V\,T}/(2\,d) \quad (10\text{-}18)$$

$$-\xi + \zeta = (X_{H\,T} + Y_{V\,T})/(2\,d) \quad (10\text{-}19)$$

$$\xi + \eta = (X_{V\,T} - Y_{H\,T})/(2\,d) \quad (10\text{-}20)$$

From the expressions (10-19) and (10-20), $\xi$ and $\eta$ are obtained which are substituted into the expression (10-17) or (10-18) to obtain $\zeta$:
[Expression 105]

$$\xi = (1/4\,d)\,(-X_{H\,T} - Y_{H\,T} + X_{V\,T} - Y_{V\,T}) \quad (10\text{-}21)$$

$$\eta = (1/4\,d)\,(X_{H\,T} - Y_{H\,T} + X_{V\,T} + Y_{V\,T}) \quad (10\text{-}22)$$

$$\zeta = (1/4\,d)\,(-X_{H\,T} + Y_{H\,T} + X_{V\,T} - Y_{V\,T}) \quad (10\text{-}23)$$

Next, by obtaining a position displacement of light reflected from the corner cube mirror on the position sensor PS1, a translation position error of the rectilinearly moving body 2 can be obtained.

(Straightness Measuring Optical System)

In the measuring apparatus shown in FIGS. 1 and 2, an incidence laser beam is split int a transmission laser beam and a reflection laser beam by the beam splitter $BS_1$. The reflection light from $BS_1$ becomes incident upon the corner cube mirror fixed to the rectilinear motion table, reflected by CCM, returns in parallel to the incidence light, and is detected with the position sensor $PS_1$. The reflection light in CCM is always reflected at the position symmetrical to the apex of CCM. This position is detected with $PS_1$ at a twofold sensitivity when the rectilinear motion table has a translation error in the vertical and horizontal directions. Namely, the following relation is satisfied:

[Expression 106]

$$D_X = 2D_X$$

$$D_Y = 2D_Y \quad (1\text{-}1)$$

where $D_X$ and $D_Y$ represent values detected with $PS_1$ and are horizontal and vertical translation errors of the rectilinear motion table. In this case, even if the table has a rotation angle error, the measured values of translation errors are not influenced because of the characteristics of the corner cube mirror.

The laser beam transmitted through $BS_1$ is further split into a reflection beam and a transmission beam. The reflection beam from $BS_2$ is sequentially reflected by $M_{H1}$ and $M_{H2}$ constituting the horizontal, parallel two-surface mirror, and reaches the position sensor $PS_2$. The transmission beam from $SB_2$ is reflected by $M_3$ and $M_4$ to be made in parallel to the optical axis (z-axis), thereafter sequentially reflected by $M_{V1}$ and $M_{V2}$ constituting the vertical, parallel two-surface mirror, and reaches the position sensor $PS_3$. The rotation angle error components of pitching, yawing and rolling are obtained from the detection outputs of $PS_2$ and $PS_3$ according to the expressions (10-21) to (10-23), as described earlier.

With the method described above, it is possible to obtain the rotation angle errors of pitching, yawing and rolling of a rectilinear motion table from the positions of beams reflected from two vertical and horizontal, parallel two-surface mirrors disposed at an incidence angle of 45°. It is also possible to obtain a straightness including two translation error components of the rectilinear motion table, by incorporating a conventional method of measuring horizontal and vertical translation errors by utilizing the corner cube mirror.

In the optical system shown in FIGS. 1 and 2, a higher sensitivity is realized if a multi-reflection system is adopted by fixing a roof prism or rectangular two-surface mirror outside of the rectilinear motion table and sandwiching the corner cube mirror and parallel two-surface mirrors. A higher sensitivity is also realized if a sensor such as a four-division photosensor is used as the position sensor. In the optical system shown in FIGS. 1 and 2, $PS_1$ is disposed at a position opposite to $PS_2$ and $PS_3$. If this layout is inconvenient for a measuring work or the measuring apparatus becomes not compact, a roof prism or rectangular two-surface mirror may be fixed on one side to dispose all position sensors on the same side.

FIGS. 6 and 7 illustrate a relation between mirrors and a light beam according to another embodiment of the invention. A direction of the surface of a first reflection mirror $M'_{H2,\,0}$ constituting a horizontal, parallel two-surface mirror shown in FIG. 6 is given by:
[Expression 107]

$$m'_{H2,0} = \begin{pmatrix} -1/(\sqrt{2}) \\ 0 \\ 1/(\sqrt{2}) \end{pmatrix}$$

whereas a direction of the a second reflection mirror M'$_{H1,0}$ is given by:

[Expression 108]

$$m'_{H1,0} = \begin{pmatrix} 1/(\sqrt{2}) \\ 0 \\ -1/(\sqrt{2}) \end{pmatrix}$$

A direction of the surface of a first reflection mirror M'$_{H2,0}$ constituting a vertical, parallel two-surface mirror shown in FIG. 7 is given by:

[Expression 109]

$$m'_{V2,0} = \begin{pmatrix} 0 \\ 1/(\sqrt{2}) \\ 1/(\sqrt{2}) \end{pmatrix}$$

whereas a direction of the a second reflection mirror M'$_{V1,0}$ is given by:

[Expression 110]

$$m'_{v1,0} = \begin{pmatrix} 0 \\ -1/(\sqrt{2}) \\ -1/(\sqrt{2}) \end{pmatrix}$$

[Effects of the Invention]

According to the present invention, it is possible to measure the rotation angle errors including pitching, yawing and rolling components of a rectilinear motion table at the same time with a single method by using two parallel two-surface mirrors perpendicular relative to a laser beam.

BRIEF DESCRIPTION OF THE SEVERAL VIEWS OF THE DRAWINGS

FIG. 1 An illustrative diagram showing the plan structure of a measuring apparatus for measuring rectilinear motion and rotation angle errors of a rectilinearly moving body according to the invention.

FIG. 2 An illustrative diagram showing the front structure of the measuring apparatus for measuring rectilinear motion and rotation angle errors of a rectilinearly moving body according to the invention.

DESCRIPTION OF REFERENCE NUMERALS

Figure 3:
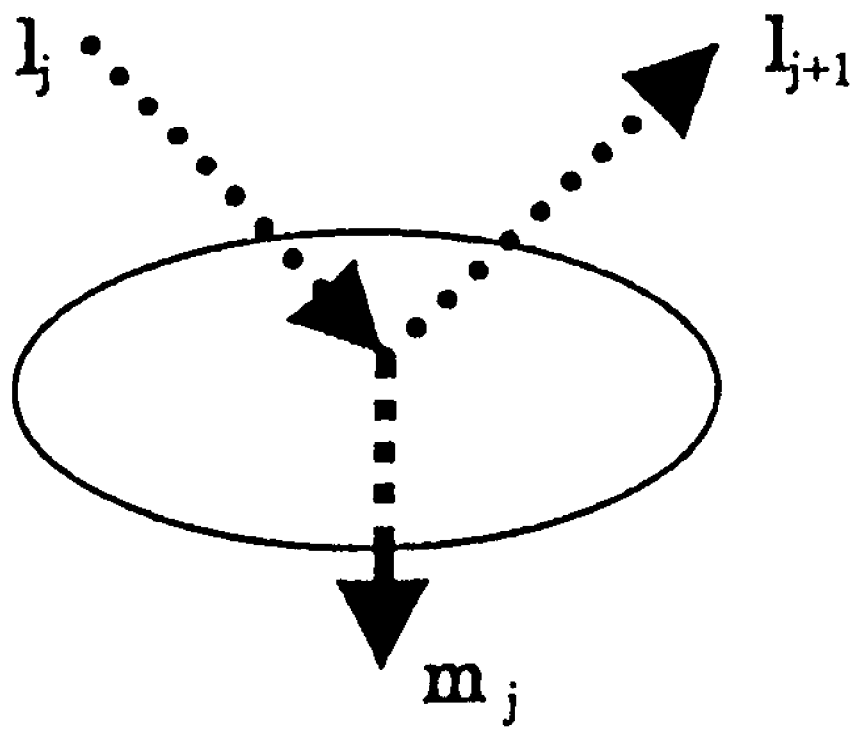
FIG. 3 An illustrative diagram showing a direction of a reflection mirror surface.
Figure 4:
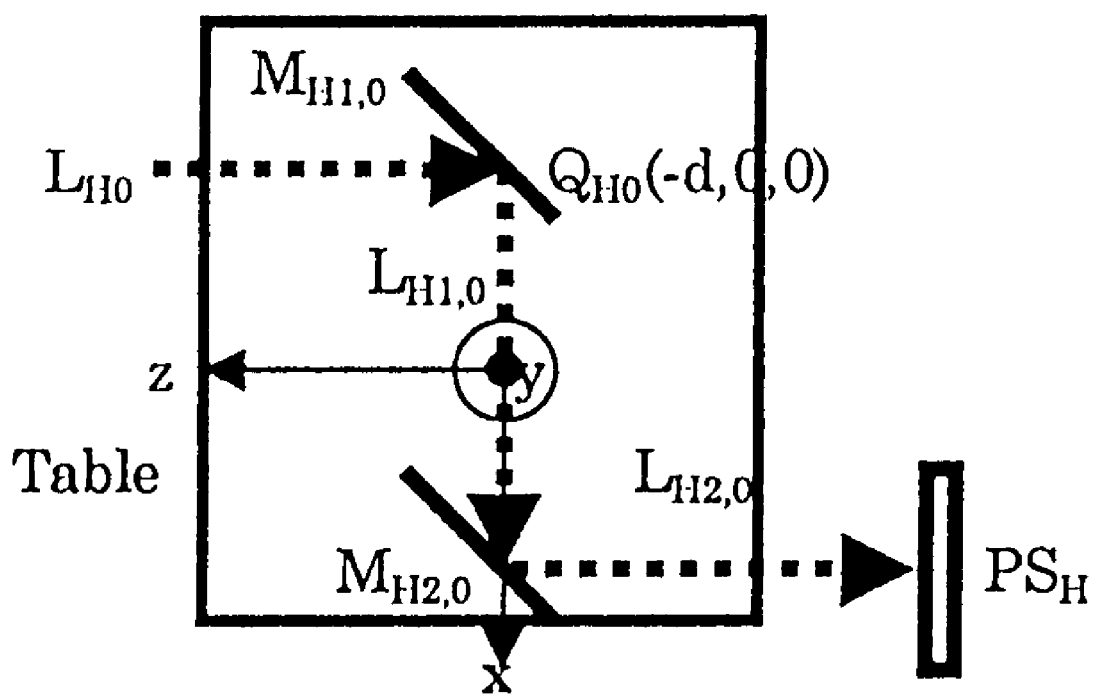
FIG. 4 An illustrative diagram showing a principle of measuring a rotation angle error.
Figure 5:
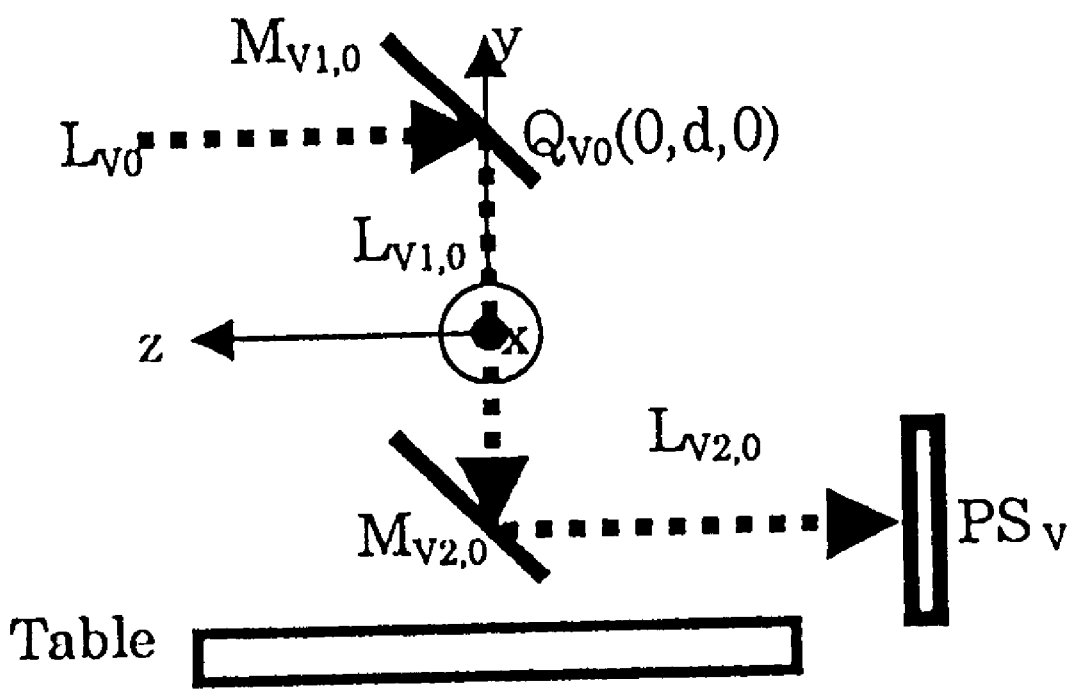
FIG. 5 An illustrative diagram showing a principle of measuring a rotation angle error.
Figure 6:
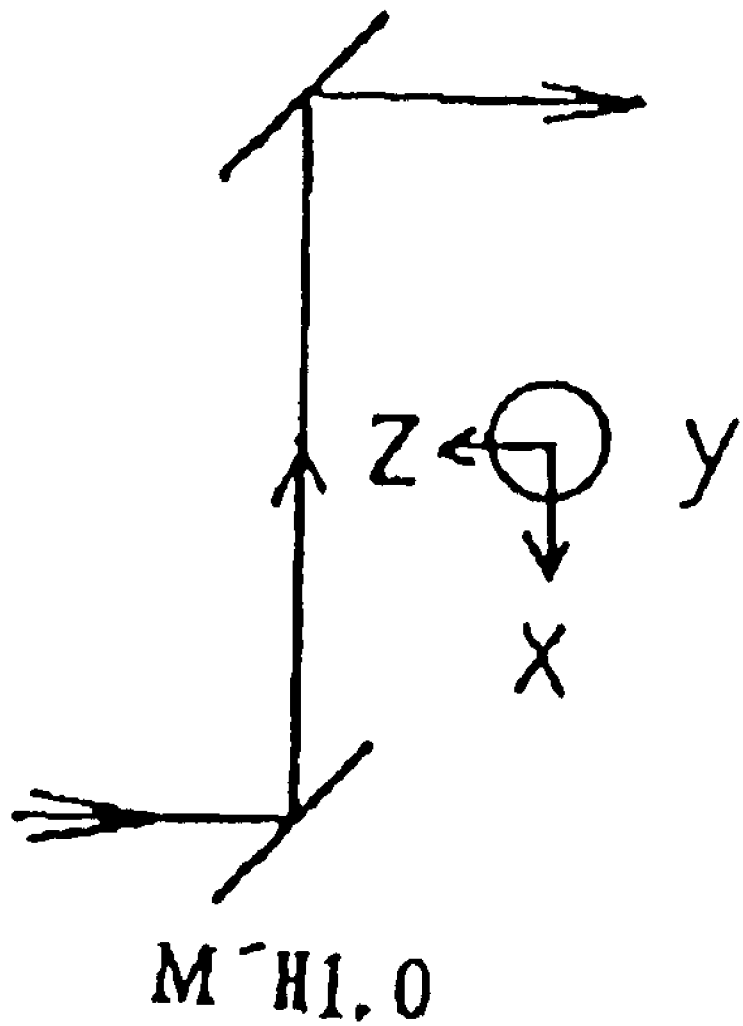
FIG. 6 An illustrative diagram showing a principle of measuring a rotation angle error.
Figure 7:
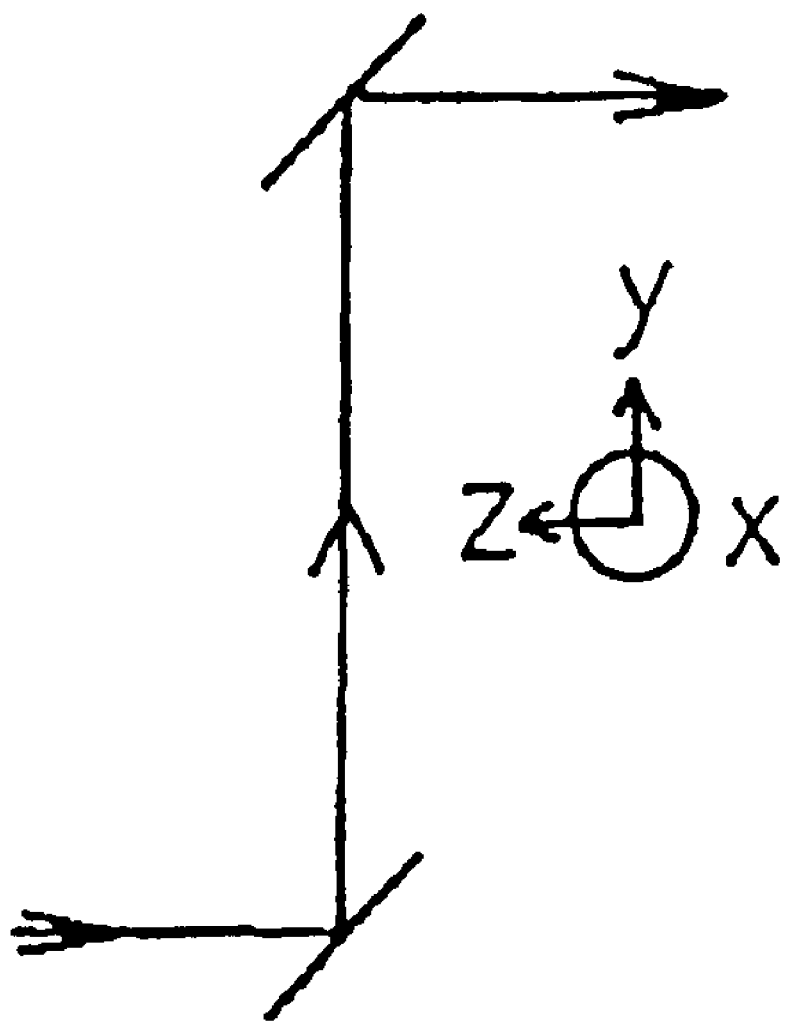
FIG. 7 An illustrative diagram showing a principle of measuring a rotation angle error.

1 . . . measuring apparatus for measuring rectilinear motion and rotation angle errors, 2 . . . rectilinearly moving body, 3 . . . horizontal, parallel two-surface mirror, 4 . . . vertical parallel two-surface mirror, 5 . . . light source, $M_{12}$ . . . reflection mirror, $M_{21}$ . . . reflection mirror, $M_{22}$ . . . reflection mirror, CCM . . . corner cube mirror, S1 . . . semi-transparent mirror, BS2 . . . semi-transparent mirror.

What is claimed is:

1. A straightness measuring apparatus for a rectilinearly moving body, comprising:

a horizontal, parallel two-surface mirror positioned in a horizontal plane and including two reflection mirrors whose reflection surfaces face each other and are spaced by a distance ($\sqrt{2}$)d;

a vertical, parallel two-surface mirror positioned in a vertical plane and including two reflection mirrors whose reflection surfaces face each other and are spaced by a distance ($\sqrt{2}$)d;

a light source for generating a laser beam;

semi-transparent mirrors for splitting the laser beam into two laser beams;

optical path changing reflection mirrors for changing a direction of each laser beam; and position sensors for detecting positions of the laser beam reflected from said horizontal, parallel two-surface mirror and said vertical, parallel two-surface mirror, wherein a direction of said horizontal, parallel two-surface mirror is set so that directions of each normal to a bottom surface of each reflection surface take respectively:

[Expression 1]

$$m_{H1}=(-1/(\sqrt{2}), 0, 1/(\sqrt{2})), m_{H2}=(1/(\sqrt{2}), 0, 1/(\sqrt{2})) \text{ or}$$

$$m'_{H1}(1/(\sqrt{2}), 0, -1/(\sqrt{2}), m'_{H2}(-1/(\sqrt{2}), 0, -1/(\sqrt{2}))$$

a direction of said vertical parallel two-surface mirror is set so that directions of each normal to a bottom surface of each reflection surface take respectively:

[Expression 2]

$$m_{V1}=(0, 1/(\sqrt{2}), -1/(\sqrt{2})), m_{V2}=(0, -1/(\sqrt{2}), 1/(\sqrt{2})) \text{ or}$$

$$m'_{V1}=(0, 1/(\sqrt{2}), 1/(\sqrt{2})), m'_{V2}=(0, -1/(\sqrt{2}), -1/(\sqrt{2}))$$

and said light source, said semi-transparent mirrors, said optical path changing reflection mirrors and said position sensors are fixed to positions outside of the rectilinearly moving body.

2. A straightness measuring apparatus for a rectilinearly moving body, comprising:

corner cube reflection mirrors:

a horizontal, parallel two-surface mirror positioned in a horizontal plane and including two reflection mirrors whose reflection surfaces face each other and are spaced by a distance ($\sqrt{2}$)d;

a vertical, parallel two-surface mirror positioned in a vertical plane and including two reflection mirrors whose reflection surfaces face each other and are spaced by a distance ($\sqrt{2}$)d, said horizontal and vertical, are fixed to positions outside of the rectilinearly moving body.

* * * * *